(12) United States Patent
Harman

(10) Patent No.: US 6,498,892 B1
(45) Date of Patent: Dec. 24, 2002

(54) POSITIONING DEVICE ESPECIALLY FOR ASSEMBLING OPTICAL COMPONENTS

(76) Inventor: Murray R. Harman, 90 Ashpark Crescent, Ottawa, Ontario (CA), K1T 3N7

(*) Notice: Subject to any disclaimer, the term of this patent is extended or adjusted under 35 U.S.C. 154(b) by 285 days.

(21) Appl. No.: 09/671,143

(22) Filed: Sep. 28, 2000

Related U.S. Application Data

(60) Provisional application No. 60/222,646, filed on Aug. 3, 2000.

(51) Int. Cl.[7] ................................................ G02B 6/38
(52) U.S. Cl. ...................................... 385/137; 385/136
(58) Field of Search ................................ 385/137, 136, 385/140, 134

(56) References Cited

U.S. PATENT DOCUMENTS

| | | |
|---|---|---|
| 4,720,163 A | 1/1988 | Goodwin et al. |
| 4,854,667 A | 8/1989 | Ebata et al. |
| 4,884,015 A | 11/1989 | Sugimoto et al. |
| 4,997,123 A | 3/1991 | Backus et al. |
| 5,422,725 A | 6/1995 | Vilhelmsson |
| 5,611,011 A | 3/1997 | Morlion et al. |
| 5,633,494 A * | 5/1997 | Danisch ........................ 385/13 |
| 5,734,768 A | 3/1998 | Kim et al. |
| 5,857,047 A | 1/1999 | Strand et al. |
| 5,881,198 A | 3/1999 | Haake |
| 5,926,594 A | 7/1999 | Song et al. |
| 6,064,781 A | 5/2000 | Seibold et al. |

FOREIGN PATENT DOCUMENTS

DE   3732566   7/1988

\* cited by examiner

Primary Examiner—Hung Xuan Dang

(57) ABSTRACT

A positioning device that is ideally suited for the assembly of optical components, particularly fiber optic components utilizing small-core single-mode optical fiber. The invention teaches a structure that can be used for 3 axis positioning and alignment wherein all of the control actuators are located on a common axis to improve operator adjustment efficiency and reduce repetitive motion strain. The device uses flexible elements to connect relatively movable parts, including parts which move orthogonally relative to each other. The device also has a lever arrangement which provides a mechanical advantage for the control actuators.

20 Claims, 6 Drawing Sheets

POSITIONING DEVICE ESPECIALLY FOR ASSEMBLING OPTICAL COMPONENTS

This application claims priority of U.S. provisional application No. 60/222,646 filed Aug. 3, 2000.

BACKGROUND OF THE INVENTION

1. Field of the Invention

In assembling micro-optic structures and in particular those utilizing fiber optic waveguides, it is often necessary to control relative spatial alignments with extremely fine precision. Some optical components use optical fibers having a core region that carries a beam of light that is of the order of 10 microns in diameter (and even smaller in some cases). In order to assemble such a component the optical fibers have to be manipulated with a precision level on the order of $\frac{1}{10}$ of a micron.

2. Prior Art

In the past, optical fibers components have been assembled using known 3-axis ball-bearing positioners. Anyone who has attempted to achieve stable alignment using single-mode optical fiber with such known kinds of positioners equipped with micrometer actuators will attest to the lack of required precision. Crossed roller and ball type stages inherently require preload which generates motional friction and have a resolution limit set by the randomness of the required drive force due to dust and surface variations associated with the frictional interfaces and the limited stiffness of actuator mechanisms.

Other designs of positioners offer frictionless movement with the use of flexure-based designs but often at the expense of overall mechanical stiffness. A single parallel cantilever pair will generate an arc-error in its trajectory. What is commonly done is to combine two cantilever pairs into a compound cantilever stage so as to have one compensate the other and provide perfect linear motion. Compound cantilever stages are very large for their available travel as conventional designs consist of two separate compound stages that are effectively joined at a centerline to maintain high off-axis stiffness. One of the objects of this invention is to provide a compound cantilever stage that is much smaller than the conventional design.

The majority of 3-axis positioning equipment is made up by staging single axis units one on top of each other using angle plates. This results in a structure that has diminished resolution and stiffness as one moves progressively further from the mounting frame of reference. In many designs the stiffness of the overall unit is inadequate to resist the forces required to operate the actuators. In these cases the operator must use a touch and release method where the signal is adjusted and the operator then has to release the actuator to witness the result. Another downfall of a 3-axis positioner made up of three individual orthogonally arranged stages is the fact that the actuators are also arranged in an XYZ configuration, i.e. each has an axis perpendicular to the other two actuators, making prolonged use strenuous due to the required hand movements.

An inherent limitation to the resolution of nearly all positioning systems lies in the use of what can be termed simple axial actuators. A micrometer head or a complex piezo micrometer head are examples of simple actuators as they produce a displacement that is used to control the movement of a translation stage in a direct ratio. For example, a 1 micron movement of the shaft of said actuator is used to produce a 1 micron movement of the corresponding translation stage. As a result, all motional errors such as hysteresis or randomness of movement inherent in the actuator itself are passed on directly to the translation stage. The requirement for sub-micron resolution also necessitates the requirement for differential micrometer and micro-stepped stepper-motor driven lead screw drives in order to achieve the necessary resolution since a single thread micrometer under hand control can't be easily adjusted at such fine a resolution. The general trend towards increased resolution and stability in positioning equipment has been driven by the increased use of small-core single-mode optical fibers over the larger core multimode optical fibers which require less precision in alignment manipulation. In order to remove the effect of operator induced forces, a number of sub-micron resolution remote driven motor driven stages have emerged on the market. Even with fully automated positioning systems where a scan routine is carried out under computer control, some level of operator intervention is required for handling and loading the individual elements to be assembled. In many labor intensive assembly applications the cost of an automated system cannot be justified and would not be considered if an appropriate mechanical positioner were available.

SUMMARY OF THE INVENTION

It is the object of this invention to realize a 3-axis positioning device ideally suited for, but not limited to, the assembly of single-mode fiber optic components. The invention allows for all of the actuators to be placed in a common orientation to reduce hand fatigue and improve adjustment efficiency. The invention teaches a structure that provides for both coarse and fine movement while using a simple adjustment screw and a single actuator such as a micrometer head or a motorized stepping or DC motor driven actuator. The structure also allows for the fine movement to be a fraction of the travel of the control actuator while increasing movement resolution. Another aspect of the invention includes means of translating motion from one axis of movement to another. In addition, the invention teaches a linear compound flexure stage that provides for large travel and linear motion with high stiffness. In its preferred form, the invention can provide for operator insensitive adjustment when aligning single-mode optical fibers with a resolution limit that is comparable to a closed-loop piezo driven translation stage.

The invention is an improvement over a conventional stacked 3-axis unit as the operator adjustment forces act only on a single stiff linear translation stage instead of the sum of the total of all stages. It is thus possible to realize a positioning device that can operate under hand control at resolution and stiffness levels required for single-mode fiber optic alignments wherein the operator does not influence the measured optical signal level during adjustment of the unit. It is also possible with the invention to implement linear motor drive on the second and third axes without affecting the overall sensitivity to hand adjustment forces.

According to one aspect of the invention, a positioning device includes:
 a first, normally fixed support;
 a movable support mounted on said fixed support and constrained to move in a generally rectilinear manner in a first direction;
 a first actuator mounted on the fixed support for moving the movable support in the first direction;
 a second actuator mounted on said movable support in substantially parallel relationship to the first actuator;
 holding means for an object to be positioned, the holding means mounted on said movable support for movement relative to said movable support in a second direction which is perpendicular to said first direction; and an orthogonal drive conversion system for converting motion of said second actuator in the first direction to movement of the holding means in the second direction.

The orthogonal drive conversion system serves to isolate the holding means from manual forces applied to the second actuator.

The orthogonal drive conversion system may include an actuator mechanism having a push rod pivoted at a first of its ends to means movable by the second actuator, and at a second end, to motion translation means for converting motion of the push rod to movement of the holding means in the second direction.

Preferably, the device includes both second and third actuators mounted on the movable support in parallel relationship to said first actuator; and the holding means is mounted on the movable support for movement relative to the movable support in second and third directions which are perpendicular to the first direction and perpendicular to each other. First and second orthogonal drive conversion systems are provided for converting motion of said second and third actuators respectively to movement of the holding means in said second and third directions. Each orthogonal drive conversion system may include an actuator mechanism including a push rod pivoted at a first end to means movable by the respective second and third actuators, and at its second end to motion translation means for converting movement of the push rod to movement of the holding means in the respective second and third directions.

One aspect of the invention is a compound cantilever stage that is one-half of the conventional design, the latter using two separate compound stages that are effectively joined at a centerline to maintain high off-axis stiffness. Traditionally, the one-half arrangement is not used as the intermediate frame of reference would move in response to external loads placed on the system and limit off-axis stiffness. It can be shown however, that if the intermediate frame in a compound cantilever stage were to be forced to move one-half of the overall displacement, then high stiffness can be achieved while requiring only one half of the conventional compound cantilever design. An aspect of this invention is to provide a forcing or control means to set the displacement of the intermediate frame of reference of a compound cantilever stage to one half of the output displacement. In its preferred form, the control means is a beam member connected to the parts by frictionless elastic elements.

In accordance with this aspect of the invention, a positioning device includes:

a first, normally fixed support;

a movable support movable in a generally rectilinear manner in a first direction and carrying holding means for an object to be positioned;

an intermediate member which is connected to said first support by a pair of first spaced flexible elements and which is connected to the movable support by a pair of second spaced flexible elements; the arrangement being such that the first flexible elements and the second flexible elements are approximately of the same length: and control means connecting said fixed support, said intermediate member and the movable support so that the movement of the intermediate member is a fixed proportion of the movement of the movable support.

Preferably, the control means comprises a rigid member connected to the intermediate member at a position midway between its connections to the fixed support and the movable support, so as to ensure that the movement of the intermediate member is about one-half that of the movable support.

Another aspect of the invention provides a lever type mechanical advantage between the actuators and the mechanism producing movement in the second and third directions. In accordance with this aspect, the positioning device includes:

a support;

holding means for an object to be positioned, the holding means mounted on said support for movement in a particular direction;

an actuator mounted on said support, and an orthogonal drive conversion system for converting motion of the actuator to movement of the holding means in said particular direction, said conversion system including an actuator mechanism and a motion translation means;

said actuator mechanism including a lever having a first end connector point movably connected to the actuator, the lever having a second end portion which has second and third spaced connector points which form a triangle with the first end connector point, the second spaced connector point being located by a contact element and the third spaced connector point being located by an adjustment screw providing an adjustment which is coarse relative to the actuator, and wherein said lever has a fourth connector point in contact with a push rod which transmits motion of the lever member to the motion translation means.

The fourth connector point is positioned so that the movement of the push rod is a fraction of the movement of the actuator.

Yet another aspect of the invention relates to the nature of the motion translating means which connect the push rod or like means to the holding means. In accordance with this aspect of the invention, the positioning device includes:

a fixed support;

a movable support movable in a generally rectilinear manner in a first direction and carrying holding means for positioning an object, and also carrying an actuator, an orthogonal drive positioning conversion system for converting motion of said micrometer type actuator to movement of the holding means in a particular direction which is perpendicular to the axis of the actuator, said conversion system including an actuator mechanism and a motion translation means, said actuator mechanism including a push rod movable by the actuator; and an angularly movable part which is connected to an element fixed to said movable support by two crossing flexible elements which preferably extend perpendicularly to each other, said angularly movable part being also connected to said holding means in such manner that when angularly moved by said push rod the angularly movable element produces movement of said holding means in said particular direction which is perpendicular to the first direction.

Preferably, the crossing flexible elements, when viewed along the axis of rotation of the angularly movable part, cross each other between the fixed element and the angularly movable part at the approximate centers of the crossing flexible elements.

DESCRIPTION OF DRAWINGS

A preferred embodiment of the invention will now be described with reference to the accompanying drawings, in which.

DESCRIPTION OF THE PREFERRED EMBODIMENT

Figure 1:
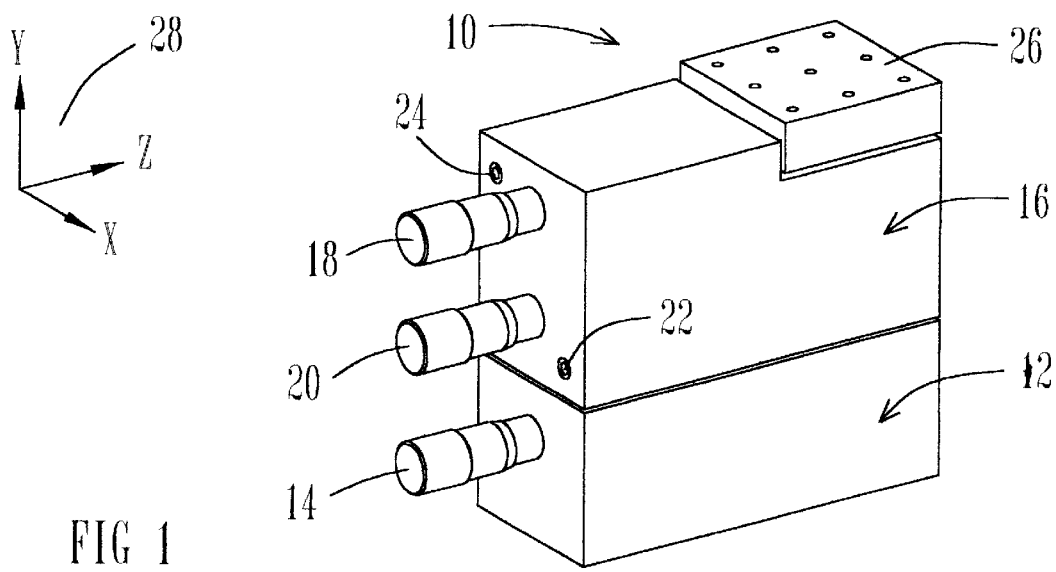
FIG. 1 shows a perspective view of a 3-axis XYZ positioner in accordance with the invention wherein all of the control actuators are oriented parallel to a common axis.

The 3-axis positioning device according to the invention is shown in block form in FIG. 1 and is indicated by the number 10 in the drawings. As can be seen, three micrometer type actuators 14, 18, 20 are oriented parallel to a common axis which simplifies adjustment and reduces operator hand fatigue. It is also possible to arrange the actuators on or about a common central plane which eliminates the need for manufacturing a left-hand and right-hand version of the invention as is the common practice with conventional 3-axis designs. In its entire form, the 3-axis positioner consists of two portions. Firstly, a linear translation stage 12 that is controlled by an actuator 14, and secondly a top portion 16 that is affixed atop the linear translation stage 12. Two actuators 18, 20 allow for fine movement control at a drive ratio reduced by a lever mechanism to be described, and two adjustment screws 22, 24 provide coarse adjustment capability. In the invention as presented, the actuator 18 and adjustment screw 22 in conduction with a series of internal elements generate a relative movement at the mounting plate 26 in a first direction, namely the Y (vertical) direction as defined by the axis designator 28. The other actuator 20 and adjustment screw 24 generate a relative movement at the mounting plate 26 in the X direction using a second series of internal elements described below with reference to FIGS. 5 to 8.

Figure 2:
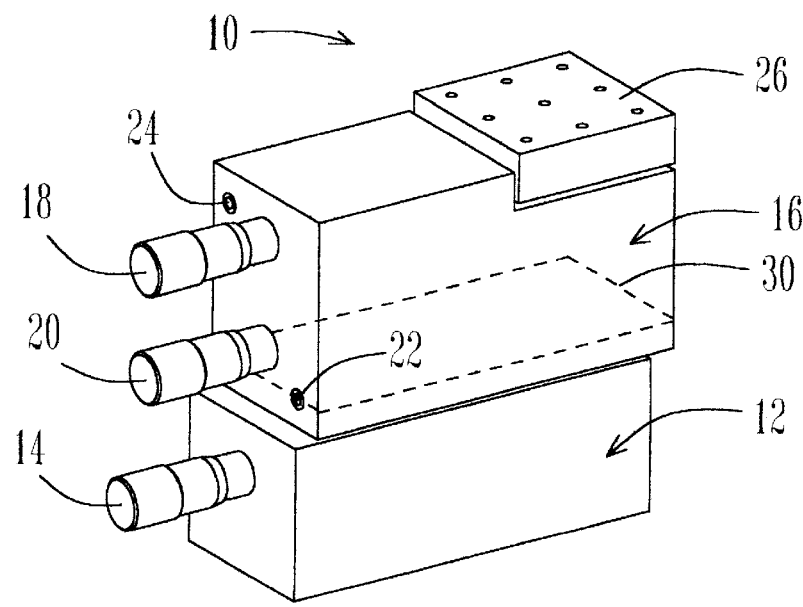
FIG. 2 shows a view of the positioner of FIG. 1 with a top portion displaced relative to a bottom portion.

FIG. 2 shows the top portion 16 of the 3-axis positioning device 10 displaced in the Z direction relative to the linear translation stage 12 on which it mounts. It can be seen that actuators 18, 20 mount directly to the top portion 16 which is fastened to a movable support provided by top plate 30 of the linear translation stage 12. This configuration greatly reduces sensitivity of the overall 3-axis positioning device 10 as the forces generated when adjusting the actuators are transferred directly to the linear travel stage 12. The system sensitivity to adjustment forces is thus only limited by the stiffness of a single linear translation stage 12, as compared to the standard stacked XYZ positioner configuration where each stage carries an actuator which will be subject to manual forces.

Figure 3:
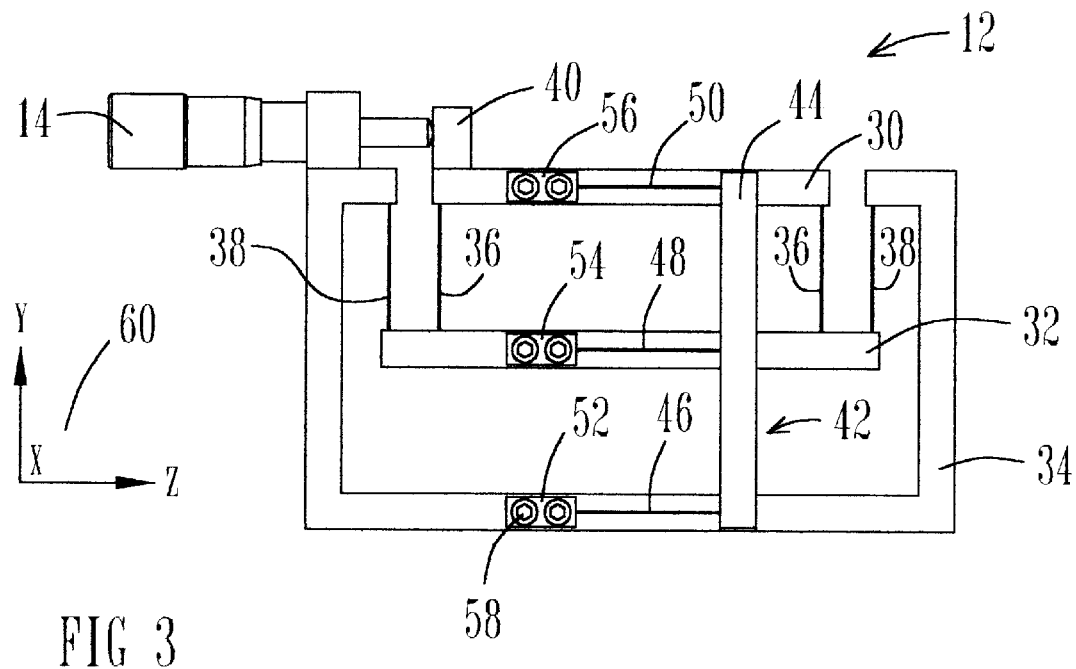
FIG. 3 shows a schematic representation of a compound linear flexure translation stage in accordance with one aspect of the invention wherein a displacement controlling or forcing means has been added.

In FIG. 3 there is a side view of a schematic representation of a linear translation stage 12 with all flexible elements in an unstressed state. The stage 12 is shown as a dual cantilever flexure stage, however an alternate form of stage 12 such as a crossed roller bearing stage could be substituted in the complete 3-axis positioning device 10 as shown in FIG. 1 without altering the utility of other aspects of the invention. The linear translation stage 12 as shown is comprised of two preferably parallel cantilever stages, the first one formed by two thin flexible plate elements 38 which have one end affixed to a stationary support or reference frame 34 and the other respective ends fastened to an intermediate member or movable plate 32. In the preferred arrangement, the two flexible elements 38 are of approximately equal length and under displacement the relative motion between the movable plate 32 and the fixed reference frame 34 will then be a parallel arcing motion. A similar second parallel cantilever stage is formed by the intermediate member or movable plate 32 which is connected to the top movable plate 30 by a second pair of thin flexible plate elements 36 having their respective ends affixed to the plates 30, 32 as indicated. The relative motion between the intermediate member or plate 32 and the top plate 30 is also a parallel arcing motion provided that the flexible elements 36 are of approximately equal length. The preferred relationship is such that the flexible plate elements 36 and 38 are of substantially equal length. An actuator 14 shown as a micrometer head acts on an anvil block 40 which is affixed to the top moveable plate 30.

A novel feature of this arrangement is a forcing or control means 42 which acts upon the structure to control the relative motion of the moveable plates 30, 32. The control means in its preferred form is elastic and frictionless but can also be made up of rigid linkages with frictional bearing joints without altering the scope of the invention. The control means 42 includes rigid beam member 44 having attached near one end a first flexure element 46 that mounts to a first termination block 52 at the other end, said termination block 52 being fastened to the stationary reference frame or support 34 with one or more fastening elements 58 or alternate attachment means such as adhesives. Affixed to the beam member 44 at or near its center is a second flexure element 48 that mounts at its other end to a second termination block 54 that is fastened to the intermediate movable plate 32. Affixed to the beam member 44 near the opposite end is a third flexure element 50 that has its other end affixed to a third termination block 56 that is fastened to the top moveable plate 30. It would be also possible to implement one or more of the flexure elements 46,48,50 as integral parts being made directly of the same portion of material as the support 34 and plates 32, 34 respectively. Preferably, the spacing between first flexure element 46 and the second flexure element 48 in Y direction as defined by the axis designator 60 is of approximately the same as the spacing between the second flexure element 48 and the third flexure element 50; i.e. the connection to the intermediate member or plate 32 is midway between the other connection points.

Figure 4:
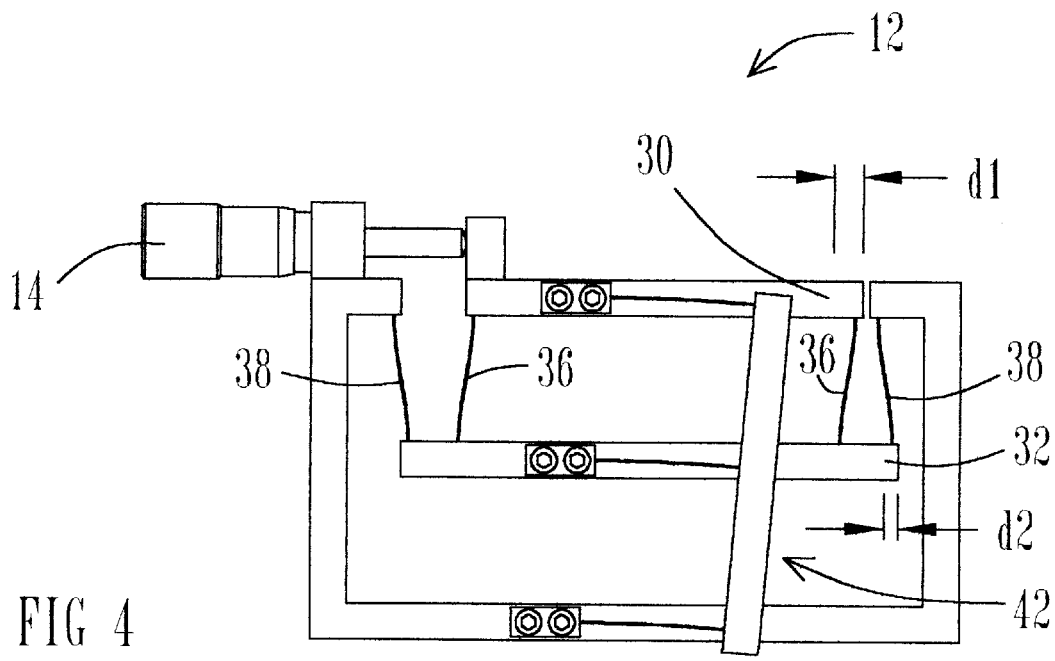
FIG. 4 shows the translation stage in a displaced position relative to that of FIG. 3.

FIG. 4 shows the stage 12 of FIG. 3 in a deflected position with the moveable plate 30 having been displaced in the Z direction by a distance $d_1$ by a corresponding movement of the actuator 14. The control means 42 in its preferred form as defined in FIG. 3 will impart a displacement $d_2$ that is one half that of $d_1$ onto the moveable plate 32 which is elastically mounted in Z direction by flexible plate elements 36,38. If the control element 42 were removed then the top moveable plate 30 would still move in a perfect linear trajectory in the Z direction provided that the flexible elements 36 and the flexible elements 38 were of equal length and flexure stiffness in the Z direction and no external load in the Y direction were applied to the top moveable plate 30. If the stiffness were not equal or an external load were present then the control means 42 would be required to ensure that the displacement $d_2$ was half that of $d_1$ which is the condition required to ensure that the arc error motion of the first parallel cantilever stage is equal to that of the second parallel cantilever stage. The two arc error motions of the two parallel cantilever stages are opposite in relative direction and cancel each other when the aforementioned conditions are met resulting in linear motion at the top moveable plate 30.

Figure 5:
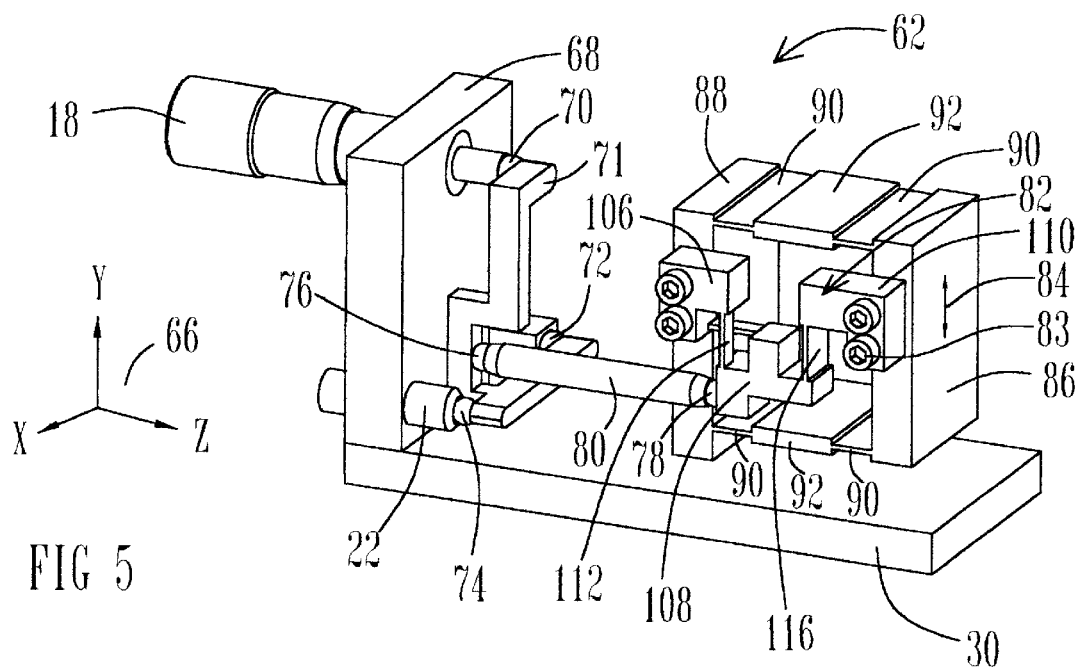
FIG. 5 shows perspective view of a system of elements used to generate relative motion that is orthogonal to the motion of a control actuator in accordance with the invention.

FIG. 5 shows a perspective view of an orthogonal drive positioning system 62 in accordance with the invention. The system is contained in the top portion 16 of FIGS. 1,2 having its cover plates removed for viewing, and which is mounted on the top movable plate or support 30. The system 62 is shown in a nominal mid-position with all flexible elements in an unstressed state. The system 62 provides means for controlling a resultant motion in a direction that is orthogonal to the axis of movement of an actuator. In this embodiment, movement from a second actuator 18, which is oriented in the Z direction, is used to control a resultant motion 84 in the Y or vertical direction as defined by the axis the designator 66. The shaft of the actuator 18 pushes on a contact element shown as a partial spherical element 70 having a flat engagement surface and a body portion that rests in a contact seat that is part of a pivoting plate or lever 71. A partial spherical element 70 is shown to facilitate the use of a rotating shaft type actuator as the contact interface formed between the actuator 18 and the flat surface of the partial spherical element 70 can accommodate both relative rotation and relative lateral shear displacement in the XY plane. The pivoting plate 71 has formed in it three additional contact seats that contact spherical elements 72, 74, 76. A first spherical element 72 and a second spherical element 74 are located on an axis of rotation defined by their respective centers, and form a triangle with the contact seat for element 70. The partial spherical element 70, first spherical element 72 and second spherical element 74 are co-located on a plane defined by their respective centers. A third spherical element 76 forms a ball joint between the pivoting plate 71 and an axial push rod 80. A fourth spherical element 78 forms a ball joint between the other end of the push rod 80 and a contact seat located in motion translation means provided by a crossed cantilever translation stage 82. The fourth spherical element 78 moves essentially in the Z direction and causes an angularly movable part 108 of translation stage 82 to rotate which results in a movement 84 of moving plate 86 in the Y direction as will be described below.

A parallel cantilever flexure stage is depicted as the preferred type of connection between the fixed plate 88 and the movable plate 86. Other types of movement stages could be used in conduction with the translation stage 82 but would invariably limit the resolution of the orthogonal drive conversion system 62 as defined by the invention. The parallel cantilever flexure stage is comprised of the fixed plate 88, to which are attached two flexure elements each having a thin flexible portion 90 on each side of a plate portion 92. The plate portion 92 between the flexible portions 90 serves to enhance the stiffness in the off-axis directions X and Z of the moving plate 86 that is affixed to the other ends of the flexure elements.

A mounting plate 68 is fastened to the top moveable plate 30 and both mounts the actuator 18 and transfers adjustment forces directly to the linear translation stage 12 as shown internally in FIGS. 3, 4. The orthogonal drive conversion system 62 may also be used with the moveable plate 30 as a stationary reference plate or mounting base to allow the conversion system 62 to be used as a stand-alone single axis system.

Figure 6:
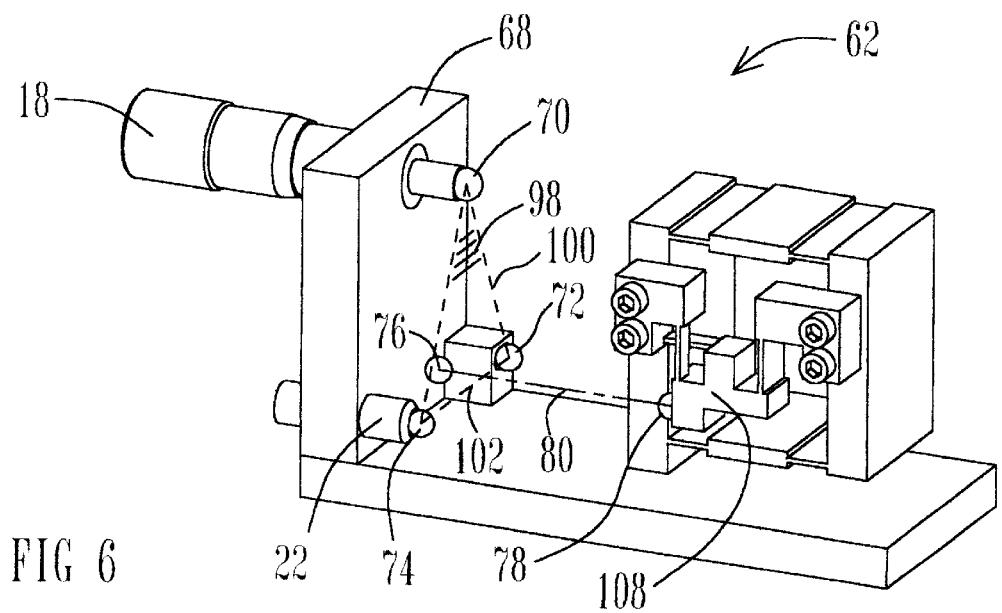
FIG. 6 shows a view of FIG. 5 with two elements removed.

FIG. 6 is identical to that of FIG. 5 except that the pivoting plate 71 and the axial push rod 80 have been replaced by respective line representations. A reference plane 98 defined by three points is formed by and passes through the centers of the partial spherical element 70, first spherical element 72 and a second spherical element 74. The reference plane 98 is also coincident with an identical reference plane formed by contact seats in the pivoting plate 71. The three spherical elements 70, 72, 74 are held in a reference plane 98 having a geometric spacing that is constant in relation to each other as defined by the respective contact seats of the elements 70, 72, 74 in the pivoting plate 71. A spatially stable arrangement of the three spherical elements 70, 72, 74 is achieved in the following preferred manner. The second spherical element 74 is located in a contact seat formed into an end portion of an adjustment screw 22. The first spherical element 72 rests in a seat that is preferably slightly elongated in the X direction. Either or both of the spherical elements 72,74 can be made moveable being located by the tip of an adjustment screw or similar adjustment means. The partial spherical element 70 has a flat surface that forms a sliding interface with the end of the actuator 18. It is a preferred aspect of the invention that the reference plane 98 be substantially orthogonal with the axis formed by the third spherical element 76 and the fourth spherical element 78 when the actuator 18 and adjustment screw 22 are at the center of their respective travel ranges. The third spherical element 76 is ideally located on the reference plane 98 to minimize cosine errors resulting from movement of the reference plane 98 as the actuator 18 and adjustment screw 22 are moved away from the center of their respective travel ranges.

As the adjustment screw 22 is moved, the second spherical element 74 also moves in the Z direction which will result in a rotation about a first axis of rotation 100 formed by the partial spherical element 70 and the first spherical element 72. The ratio of the shortest distance from the third spherical element 76 and the first axis of rotation 100 to the shortest distance from the second spherical element 74 to the first axis of rotation 100 determines the ratio of the movement of the axial push rod 80 to that of the adjustment screw 22 in the Z direction. In a preferred embodiment, the adjustment screw 22 is used to provide a coarse adjustment feature where a typical ratio would be between 0.5 and 1 although any ratio can be selected depending on where the third spherical element 76 is placed relative to the other spherical elements 70, 72, 74. As the actuator 18 is moved, the partial spherical element 70 moves primarily in the Z direction which will result in a rotation about a second axis of rotation 102 formed by the first spherical element 72 and the second spherical element 74. The ratio of the shortest distance from the third spherical element 76 and the second axis of rotation 102 to the shortest distance from the partial spherical element 70 to the second axis of rotation 102 determines the ratio of the movement of the axial push rod 80 to that of the actuator 18 in the Z direction, i.e. the mechanical advantage between the actuator and the push rod. In a preferred embodiment, the micrometer actuator 18 is used to provide fine adjustment control. If, for example, a ratio of 1/25.4 is chosen, then a standard imperial micrometer head with a travel range of 0.500 inches and graduations of 0.001 inch per division can be converted to read in microns per division over a ½ millimeter range of travel. Of course other ratios can be selected.

Figure 7:
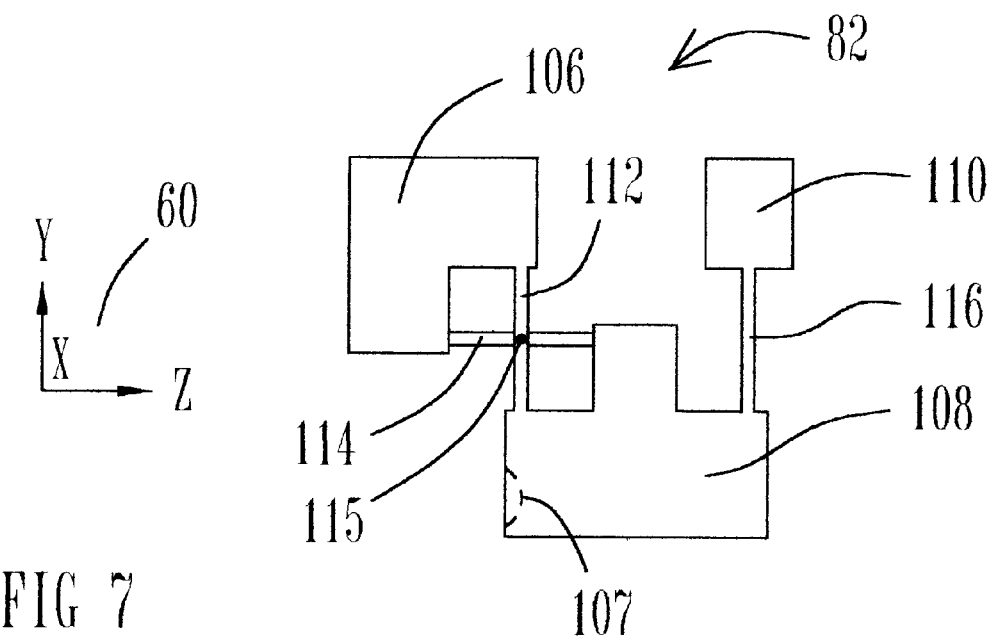
FIG. 7 shows a close up schematic representation of a crossed-cantilever translation stage, one of the elements of the system of elements as shown in FIG. 5.
Figure 8:
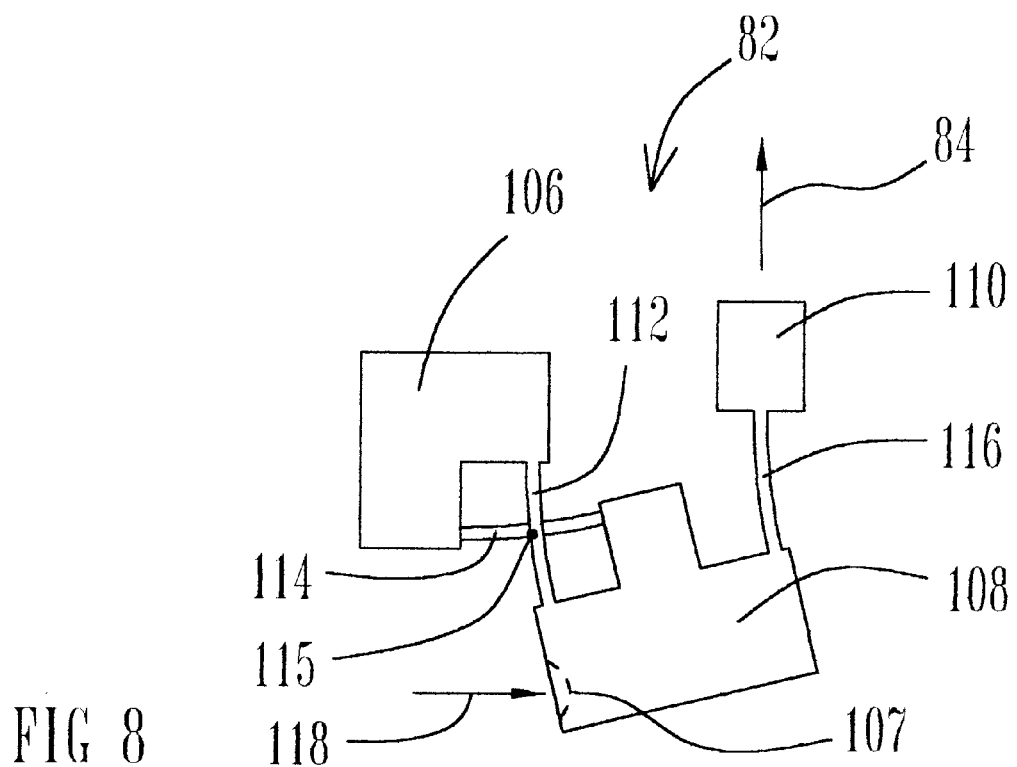
FIG. 8 shows the crossed cantilever translation stage a rotated position relative to its position as shown in FIG. 7 to demonstrate how motion is translated orthogonally from one axis of motion to another in accordance to the invention.
Figure 9:
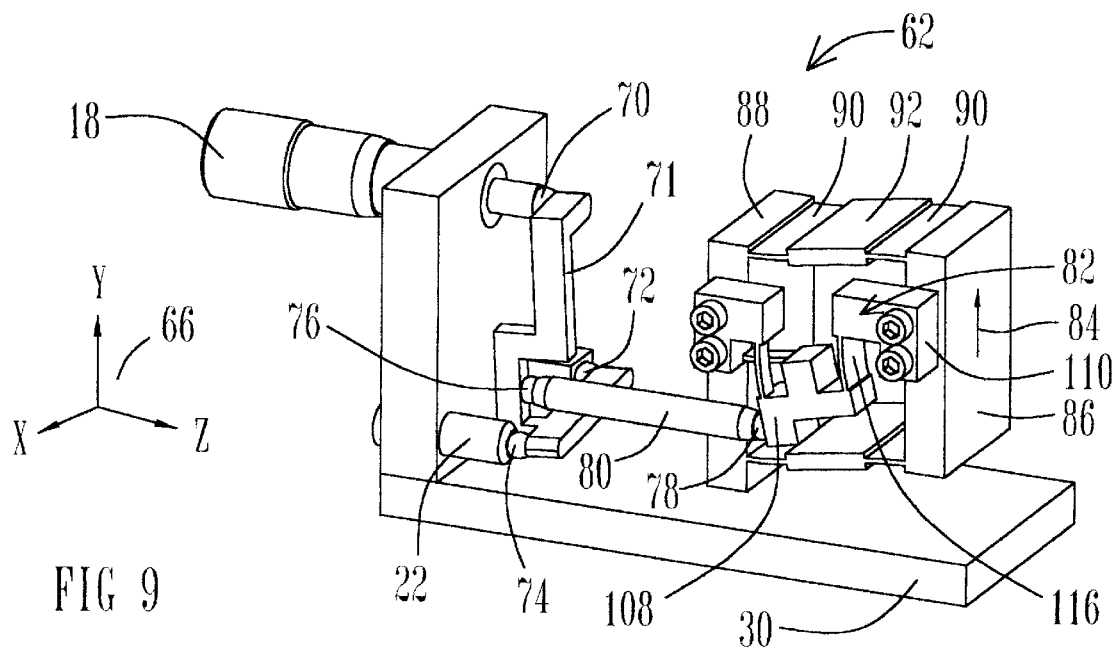
FIG. 9 shows a view of a coarse adjustment screw in a displaced position in order to demonstrate the overall motion of the system of elements relative to their respective neutral positions as shown in FIG. 5.
Figure 10:
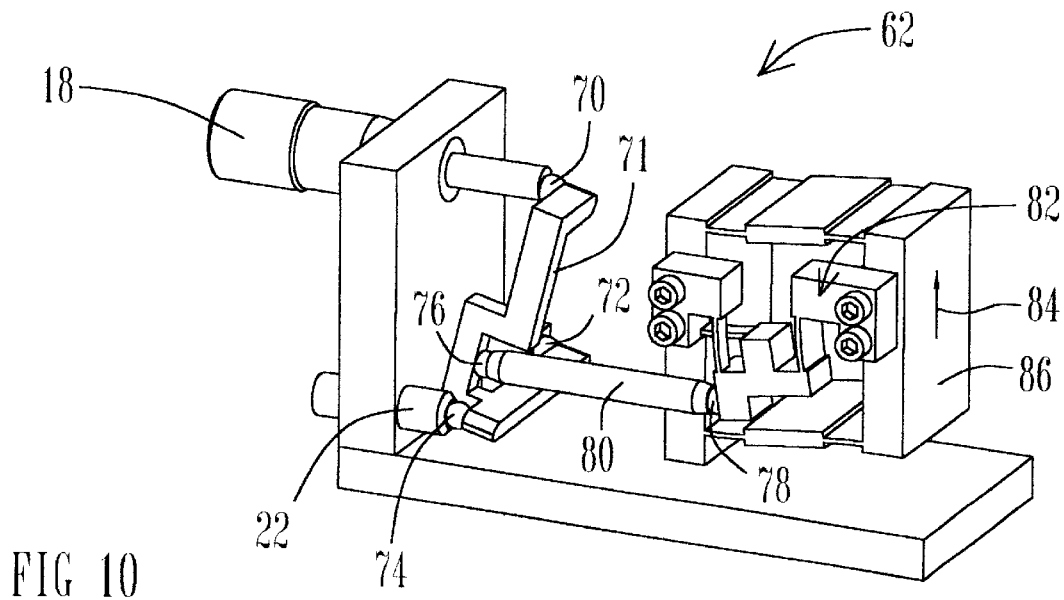
FIG. 10 shows a view of the main control actuator in a displaced position as used to provide fine adjustment control in order to demonstrate the overall motion of the system of elements relative to their respective positions as shown in FIG. 5.

FIGS. 7 and 8 show details of the crossed cantilever translation stage or motion translating means 82. As shown, an elastic hinge is formed by arranging at least one first flexure element 112 and at least one second flexure element 114 preferably in an orthogonal configuration such that their physical centers are substantially coincident when seen along the axis of the angularly movable part 108, and define an imaginary center of rotation 115 about the X-axis. The lengths of the flexure elements 112, 114 need not be the same but are shown as such. The structure serves as a hinge for limited rotational displacements in the range say of +/−10 degrees. The part 108 is connected by a flexible web 116 to a second moveable block 110, which is in turn attached to moveable plate 86. Each individual elastic element 112, 114, 116 is long and thin in geometry having low flexure stiffness about the X-axis as defined by the axis designator 60 and a relatively high axial stiffness. The elastic elements 112,114 thus serve to compliment each other's weak direction and form a high-stiffness elastic hinge. It is a unique curiosity of the structure that if the elastic elements are positioned as described in this preferred embodiment, then the overall flexure stiffness of the stage 82 is the sum of the individual flexure elements. The elements 112,114 can also be arranged with their centers non-coincident but this will increase the flexure stiffness of the overall stage 82. Functionally, the angularly movable part or block 108 is constrained by crossed cantilever flexure elements 112, 114 having at least one of each in each direction such that the block 108 rotates about a center of rotation 115 that is oriented about the X-axis. Orthogonal motion is coupled into and out of the movable block 108 by engaging the block 108 with a displacement or force from one direction and engaging the block 108 by a second displacement or force from a second orthogonal direction. One such engagement point on the block 108 is that of the flexure element or web 116 that is attached to the block 108 at a distance away in the Z direction from the rotational center 115. The other end of the flexible web 116 is attached to a second movable block 110 which is affixed to and imparts displacement to a moving plate 86 as seen in FIGS. 9 and 10. Plate 86 also constrains the second movable block 110 from rotation. A second engagement point 107 is indicated as a dashed line which represents a contact seating surface fabricated into the block 108 that is shown in FIGS. 5, 6, 7 and 8 to engage a fourth spherical element.

Figure 11:
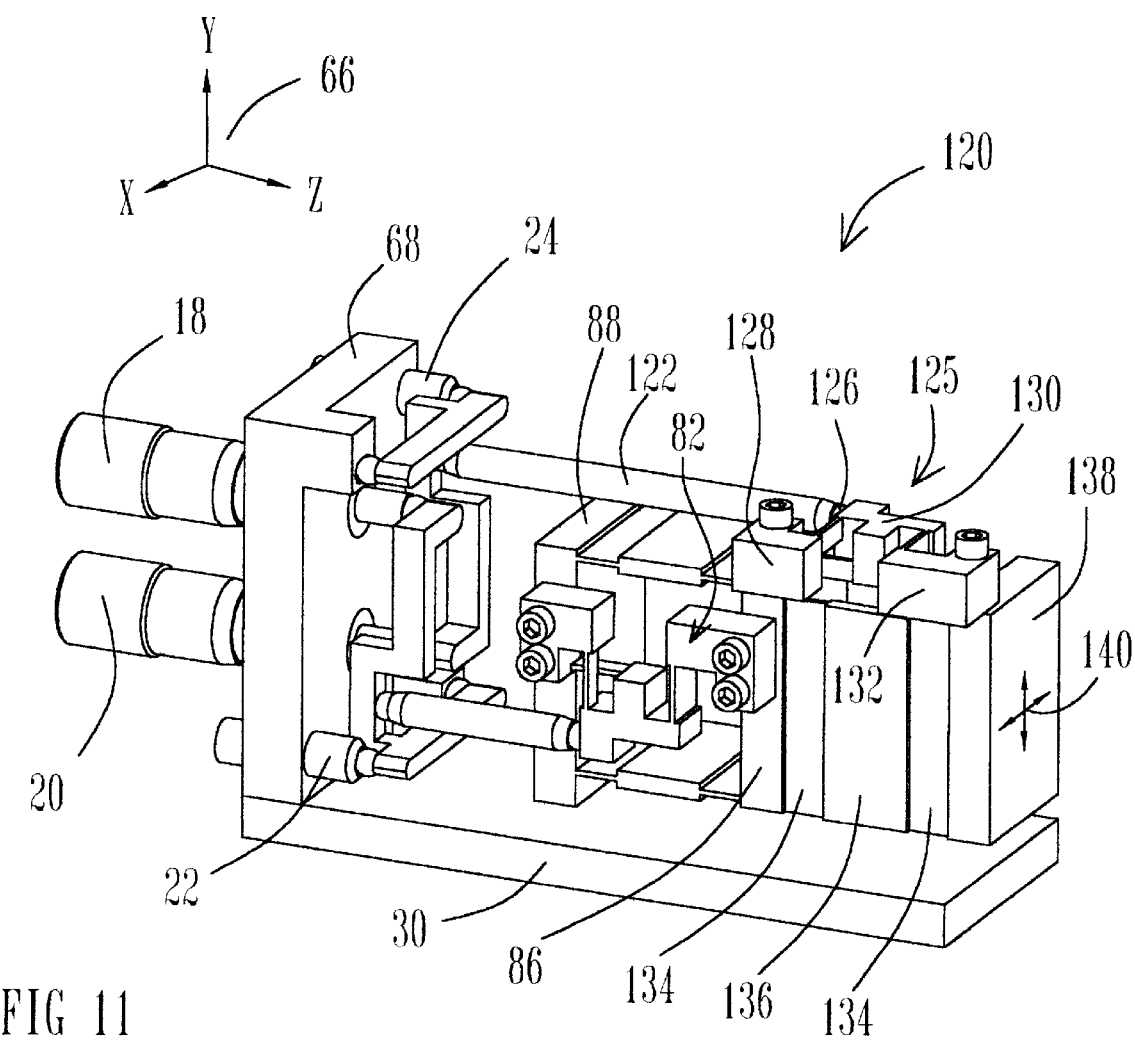
FIG. 11 shows an additional system of elements added to that of FIG. 5 to allow for translation of motion from two control actuators arranged on a common axis to that of two respective orthogonal axis.

The preferred embodiment uses a spherical engagement point 107 to permit the use of an axial push rod 80 which allows relative rotation at the engagement point 107 about more than one axis as will be shown in FIG. 11. When only one direction of relative movement or rotation about a single axis is required an attachment system similar to that of the flexible web 116 and movable block 110 can be used in place of the contact seat 107 and the respective element 78. It would also be possible to replace the elastic elements 112, 114, 116 with frictional hinges without altering the scope of other aspects of the invention. In a preferred embodiment, all or most of the elements of the translation stage 82 are fabricated in a cost effective and efficient manner from a single block of a suitable material.

FIG. 8 shows an example of the crossed cantilever translation stage 82 of FIG. 7 in a rotationally displaced position. With reference to FIGS. 9, 10 one can see how the axial push rod 80 engages the angularly movable block 108 of the stage 82 through engagement of the intermediate fourth spherical element 78. As the engagement point 107 moves principally in the Z direction by an arbitrary displacement 118 (indicated in FIG. 8), a rotation is imparted onto the angularly movable block 108 which in turn causes a displacement of the flexible web 116 and the affixed movable block 110. The final result is a displacement 84 in the orthogonal Y direction.

FIG. 9 is virtually the same as FIG. 5 except that the adjustment screw 22 has been moved in the Z direction from its center position in order to demonstrate how movement in an orthogonal direction results from movements of said screw 22. The second spherical element 74 having been moved in the Z direction imparts a rotation to the pivoting plate 71 about a first axis 100 formed by the partial spherical element 70 and the first spherical element 72. As the third spherical element 76 is in contact with the pivoting plate 70 in accordance with the geometric arrangement of FIG. 6, the element 76 also moves in the Z direction and imparts movement to the axial push rod 80 which is in contact with a third spherical ball 78. The third spherical ball 78 is in contact with the crossed cantilever stage 82, which imparts an orthogonal movement to the moving plate 86 to which it is affixed. The moving plate 86 is part of a system of elements that form a parallel cantilever flexure stage, the stage consisting of a fixed plate 88 to which are attached the ends of two flexure elements 90 which are in turn fastened to two plate portions 92 and then to two more flexible portions 90 which are attached at their other ends to the moving plate 86. The moving plate 86 is guided by the affixed elements 90,92 and moves in a constrained parallel arcing motion as can be seen from the relative movement of parts 90, 92, 86 when FIG. 9 is compared to FIG. 5. The cosine error motion resultanting from the constrained arcing motion of the moving plate 86 will be in the Z direction, which in a typical optical alignment setup represents the focus direction and is the least sensitive to such an error. In accordance with the invention, the adjustment screw 22 is used to control a resultant movement 84 that is in an orthogonal direction.

FIG. 10 is similar to FIG. 9 and demonstrates the movement of the overall system except that the actuator 18 in FIG. 10 has been adjusted in the Z direction and the adjustment screw 22 has been returned to its nominal center position. The movement of the actuator 18 also causes an overall displacement 84 of the stage 62 in the Y direction of the moving plate 86 through a similar series of linked movements to that of FIG. 9. In FIG. 10, the movement of the actuator 18 can be seen to cause a rotation of the pivoting plate 71 about a second axis of rotation formed by the centers of a first spherical element 72 and a second spherical element 74. It can be seen in FIG. 10 that the contact element shown as a partial spherical element 70 moves concurrently in an arc with the pivoting plate as evidenced by the slight relative displacement in the Y direction between the partial spherical element 70 and the end of the shaft of the actuator 18 as compared to FIGS. 5, 6. Other contact elements besides a partial spherical element 70 can be used such as the end of a spherical tipped actuator that directly engages the pivoting plate 71 or an actuator that engages an intermediate linkage similar to a push rod 80. As discussed in FIG. 6, almost any ratio between the magnitude of the overall displacement 84 and that of the actuator 18 can be chosen based on the geometric positioning of the spherical elements 70, 72, 74, 76. The ratio shown in FIG. 10 is ⅕ and was chosen to exaggerate the overall movement 84 that results from a large movement of the actuator 18. It should be noted that the invention can be configured for very small ratios of, say, 1/25.4 to give a resolution of movement comparable to or better than that of the most precise differential micrometer. It is of course possible for the actuator 18 and the adjustment screw 22 to be positioned simultaneously over any portion of their respective travel ranges. It is also possible for the first spherical element 72 to be made moveable by locating it in an additional adjustment screw similar to the adjustment screw 22 that is shown.

FIG. 11 demonstrates how a single axis stage 62 as shown in FIGS. 5, 6, 9 and 10 may be added to in order to realize a two-axis orthogonal drive conversion system 120. FIG. 11 is similar to FIG. 5 with a second orthogonal drive conversion system added to provide control of motion in the X direction having its actuator 20 and adjustment screw 24 also both oriented in the Z-axis. In order to realize a second axis of movement, a second parallel cantilever stage is added to that of FIG. 5 as follows. Two flexure elements, each having a plate portion 136 and two flexible portions 134 were added, one end affixed to a first moving plate 86 and the other end affixed to second moving plate 138. The plate portion 136 is shown as being of a greater thickness than the flexible portions 134 but need not be. The members 134,136 could be of continuous geometry becoming in effect a single part. The second flexure element 134, 136 is obscured from view by a stage 125 and is located behind said stage 125 in a similar orientation and offset in the negative X direction, the two flexure elements 134, 136 being similar in form to the other two flexure elements 90, 92 as shown in FIG. 5. The two flexure elements 134, 136 are oriented to allow flexure about the Y-axis only and a resultant relative motion in the X direction between a second moving plate 138 and the first moving plate 86. The overall system 120 is thus capable of displacement 140 in both the X and Y directions at the second moving plate 138 which provides holding means for an optical fiber or other object being positioned. Movement of the system 120 in the Y direction is illustrated in FIG. 5. Movement in the X direction of the system 120 is illustrated with reference to FIG. 5 as follows. When either the actuator 20 or the adjustment screw 24 are moved, a displacement in the Z direction of a second axial push rod 122 results which in turn engages a first angularly movable block 130 through an intermediate spherical element 126 that is located in contact seats at each respective interface.

A second crossed cantilever translation stage 125 has been mounted in the XZ plane to provide translation of motion from the Z direction to the X direction. The translation stage 125 has a fixed block 128 fastened to a first moving plate 86 and a second movable block 132 fastened to the second moving plate 138. The two-axis stage 120 is capable of movement 140 in both X and Y directions from a neutral center position if appropriate preload elements such as springs are added to the stages. Preload elements have not been shown as they are commonly known.

Table of Reference Designations

| | |
|---|---|
| 10 | 3 Axis positioning device |
| 12 | linear translation stage |
| 14 | first actuator, Z-Axis |
| 16 | top portion |
| 18 | second actuator, Y-Axis |
| 20 | third actuator, X-Axis |
| 22 | adjustment screw, Y-Axis |
| 24 | adjustment screw, X-Axis |
| 26 | mounting plate or holding means |
| 28 | axis designator |
| 30 | second movable plate or movable support |
| 32 | first movable plate or intermediate member |
| 34 | stationary reference frame; fixed support |
| 36 | thin flexible plate element |
| 38 | thin flexible plate element |
| 40 | anvil block |
| 42 | forcing means; control means |
| 44 | beam member |
| 46 | first flexure element |
| 48 | second flexure element |
| 50 | third flexure element |
| 52 | first termination block |
| 54 | second termination block |
| 56 | third termination block |
| 58 | fastening element |
| 60 | axis designator |
| 62 | orthogonal drive conversion system; |
| 66 | axis designator |
| 68 | mounting plate |
| 70 | contact element, partial spherical element |
| 71 | pivoting plate |
| 72 | first spherical element |
| 74 | second spherical element |
| 76 | third spherical element |
| 78 | fourth spherical element |
| 80 | axial push rod |
| 82 | crossed cantilever translation stage |
| 83 | fastening element |
| 84 | movement designator |
| 86 | moving plate |
| 88 | fixed plate |
| 90 | flexible portion |
| 92 | plate portion |
| 98 | reference plane defined by three points |
| 100 | first axis of rotation |
| 102 | second axis of rotation |
| 106 | fixed block |
| 107 | engagement point |
| 108 | first movable block; angularly movable part |
| 110 | second movable block |
| 112 | first flexure element |
| 114 | second flexure element |
| 115 | center of rotation |
| 116 | third flexure element; flexible web |
| 118 | arbitrary displacement |
| 120 | two axis orthogonal drive conversion system |
| 125 | second crossed cantilever translation stage |
| 126 | spherical element |
| 128 | fixed block |
| 130 | first movable block, angularly movable part |
| 132 | second movable block |
| 134 | flexible portion |
| 136 | plate portion |
| 138 | second moving plate; holding means |
| 140 | movement designator |

We claim:

1. A positioning device comprising:

a first, normally fixed support;

a movable support mounted on said first support and constrained to move in a generally rectilinear manner in a first direction;

a first actuator mounted on said fixed support for moving said movable support in said first direction;

a second actuator mounted on said movable support in parallel relationship to said first actuator, holding means for an object to be positioned, said holding means mounted on said movable support for movement relative to said movable support in a second direction which is perpendicular to said first direction; and an orthogonal drive conversion system for converting motion of said second actuator in said first direction to movement of the holding means in said second direction.

2. A positioning device according to claim 1, wherein said orthogonal drive conversion system includes an actuator mechanism having a push rod pivoted at a first of its ends to means movable by the second actuator, and at a second end, to motion translation means for converting motion of the push rod to movement of the holding means in said second direction.

3. A positioning device according to claim 2, wherein said actuator mechanism includes a lever having a first end connector point movably connected to said second actuator, said lever having a second end portion which has second and third spaced connector points which form a triangle with the first end connector point, the second spaced connector point being located by a stationary element and the third spaced connector point being located by an adjustment screw providing an adjustment which is coarse relative to said second actuator, and wherein said lever has a fourth connector point in contact with said push rod which transmits motion of the lever member to said motion translation means;

whereby said actuator mechanism can be moved by said second actuator and can also be moved by the adjustment screw, and whereby the position of the motion translation means and the holding means can also be changed both by the second actuator and said adjustment screw.

4. A positioning device according to claim 1, wherein said movable support is connected to the fixed support by an intermediate member which is connected to said fixed support by a pair of first spaced parallel flexible elements and which is connected to the movable support by a pair of second spaced flexible elements, the arrangement being such that the first and second flexible elements are approximately of the same length;

said first actuator being operable to move said movable support in rectilinear manner in the first direction; and control means connecting said fixed support, said intermediate member and the movable support so that the movement of the intermediate member is a fixed proportion of the movement of the movable support.

5. A positioning device according to claim 4, wherein the control means comprises a rigid member connected to the intermediate member at a position intermediate between its connections to the fixed support and the movable support, so as to ensure that the movement of the intermediate member is approximately one-half that of the movable support.

6. A positioning device according to claim 4, wherein said control means comprises a rigid member connected by further flexible elements to said fixed support, said intermediate member, and said movable support.

7. A positioning device according to claim 1, wherein said orthogonal drive positioning system includes a lever acting as a motion reducing mechanism such that movement of the holding means in said second direction is considerably less than that of the second actuator.

8. The positioning system of claim 1 wherein said first and second actuators are micrometer type actuators.

9. A positioning device comprising:

a first, normally fixed support;

a movable support mounted on said fixed support and constrained to move in a generally rectilinear manner in a first direction;

a first actuator mounted on the fixed support for moving said movable support in said first direction;

second and third actuators mounted on said movable support in parallel relationship to said first actuator, holding means for an object to be positioned, said holding means mounted on said movable support for movement relative to the movable support in second and third directions which are perpendicular to said first direction and perpendicular to each other; and first and second orthogonal drive conversion systems for converting motion of said second and third actuators respectively to movement of the holding means in said second and third directions.

10. A positioning device according to claim 9, wherein each said orthogonal drive positioning system includes an actuator mechanism including a push rod pivoted at a first end to means movable by the respective second and third actuators, and at its second end to motion translation means for converting movement of the push rod to movement of the holding means in the respective second and third directions.

11. A positioning device comprising:

a first, normally fixed support;

a movable support movable on said first support in a generally rectilinear manner in a first direction and carrying holding means for an object to be positioned;

an intermediate member which is connected to said first support by a pair of first spaced flexible elements and which is connected to the movable support by a pair of second spaced flexible elements, the arrangement being such that said first flexible elements and said second flexible elements are approximately of the same length;

an actuator connected to cause movement of the movable support relative to the fixed support in said first direction; and control means connecting said fixed support, said intermediate member and the movable support so that the movement of the intermediate member is a fixed proportion of the movement of the movable support.

12. A positioning device according to claim 11, wherein the control means comprises a rigid member connected to the intermediate member at a position intermediate between its connections to the fixed support and the movable support, so as to ensure that the movement of the intermediate member is approximately one-half that of the movable support.

13. A positioning device according to claim 11, wherein said control means comprises a rigid member connected by further flexible elements to said fixed support, said intermediate member, and said movable support.

14. A positioning device comprising:

a support;

holding means for an object to be positioned, said holding means mounted on said support for movement in a particular direction;

an actuator mounted on said support, and an orthogonal drive conversion system for converting motion of said actuator to movement of the holding means in said particular direction, said orthogonal drive positioning system including an actuator mechanism and a motion translation means;

said actuator mechanism including a lever having a first end connector movably connected to said actuator, said lever having a second end portion which has second and third spaced connectors which define a triangle with the first end connector, the second spaced connector being located by a contact element and the third spaced connector point being located by an adjustment screw providing an adjustment which is coarse relative to said actuator, and wherein said lever has a fourth connector in contact with a push rod which transmits motion of the lever member to said motion translation means.

15. A positioning device according to claim 14, wherein said fourth connector is located on the lever such that the lever acts as a motion reducing mechanism.

16. A positioning device according to claim 14, wherein said motion translating means includes a support element fixed to said support, and an angularly movable part which is connected to the fixed support element by at least two crossing flexible elements, said angularly movable part being also connected to said holding means in such manner that when angularly moved by said push rod the angularly movable element produces movement of said holding means in said particular direction.

17. A positioning device comprising:

a fixed support;

a movable support movable on said fixed support in a generally rectilinear manner in a first direction and carrying holding means for positioning an object, an orthogonal drive conversion system for converting motion of said actuator to movement of the holding means in a particular direction which is perpendicular to the axis of the actuator, said drive conversion system including an actuator mechanism and a motion translation means, said actuator mechanism including a push rod movable by the actuator; and an angularly movable part which is connected to an element fixed to said movable support by at least two crossing flexible elements, said angularly movable part being also connected to said holding means in such manner that when angularly moved by said push rod the angularly movable element produces movement of said holding means in said particular direction which is perpendicular to the first direction.

18. A positioning device according to claim 17, wherein said crossing flexible elements, when viewed along the axis of rotation of said angularly movable part cross each other between the fixed element and the angularly movable part.

19. A positioning device according to claim 17, wherein said actuator means includes a push rod arranged to be movable by an actuator through a motion reducing lever mechanism and having one end connected to said angularly movable part.

20. A positioning device according to claim 17, wherein said angularly movable part is connected to said holding means by a flexible web element.

* * * * *